United States Patent
Murphy et al.

(10) Patent No.: US 10,387,964 B1
(45) Date of Patent: Aug. 20, 2019

(54) SYSTEMS AND METHODS FOR GENERATING DATA REPRESENTATIVE OF MULTI-PRODUCT INSURANCE DISCOUNTS AND RELATED USER INTERFACE DISPLAYS

(71) Applicant: STATE FARM MUTUAL AUTOMOBILE INSURANCE COMPANY, Bloomington, IL (US)

(72) Inventors: Benjamin R. Murphy, Bloomington, IL (US); Howard Henderson, Jr., Katy, TX (US); Elizabeth Orzolek, Normal, IL (US); Arlene Serapin, Normal, IL (US); Lisa Bianco, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 173 days.

(21) Appl. No.: 14/877,022

(22) Filed: Oct. 7, 2015

(51) Int. Cl.
*G06Q 40/00* (2012.01)
*G06Q 40/08* (2012.01)
*G06Q 30/02* (2012.01)

(52) U.S. Cl.
CPC .......... *G06Q 40/08* (2013.01); *G06Q 30/0207* (2013.01)

(58) Field of Classification Search
CPC .............................. G06Q 40/08; G06Q 30/06
See application file for complete search history.

(56) References Cited

U.S. PATENT DOCUMENTS

| | | | | |
|---|---|---|---|---|
| 6,009,415 A | * | 12/1999 | Shurling | G06Q 30/02 705/35 |
| 7,349,860 B1 | * | 3/2008 | Wallach | G06Q 30/02 705/307 |
| 2005/0154619 A1 | * | 7/2005 | Barr | G06Q 10/10 705/4 |
| 2007/0156462 A1 | * | 7/2007 | Kazanchian | G06Q 40/08 705/4 |
| 2009/0037230 A1 | * | 2/2009 | Tracy | G06Q 30/06 705/4 |

(Continued)

OTHER PUBLICATIONS

Wikipedia ("Graphical user interface" http://en.wikipedia.org/wiki/Graphical_user_interface. Dec. 1, 2005,.*

(Continued)

*Primary Examiner* — Bruce I Ebersman
*Assistant Examiner* — Mark H Gaw
(74) *Attorney, Agent, or Firm* — Marshall, Gerstein & Borun LLP; Randall G. Rueth

(57) ABSTRACT

The present disclosure generally relates to systems and methods for generating data representative of multi-product insurance discounts and related user interface displays. The systems and methods may include receiving personal data from an insurance customer and insurance product data. The systems and methods may further include generating data representative of multi-product insurance discounts based on personal data from an insurance customer and insurance product data. The systems and methods may further include generating displays of the multi-product discounts based on data representative of multi-product insurance discounts.

15 Claims, 6 Drawing Sheets

(56) References Cited

U.S. PATENT DOCUMENTS

| | | | |
|---|---|---|---|
| 2009/0248451 A1* | 10/2009 | Goldfinger | G06Q 40/08 705/4 |
| 2013/0197947 A1* | 8/2013 | Carillo | G06Q 40/08 705/4 |
| 2014/0222469 A1* | 8/2014 | Stahl | G06Q 40/08 705/4 |
| 2014/0278577 A1* | 9/2014 | Baum | G06Q 40/08 705/4 |

OTHER PUBLICATIONS

Shah, Denish (The Dark Side of Cross-Selling. Harvard Business Review, https://hbr.org/2012/12/the-dark-side-of-cross-selling, Dec. 2012) which teaches the process and incentives of cross selling products. (Year: 2012).*

* cited by examiner

| | 105 | 115 | 120 | 125 |
|---|---|---|---|---|
| [−] | Bundling Savings: $22.53/mo | | | |
| | Product | Individual Price | Bundled Price | Savings |
| | Auto | $87.54/mo | $68.25/mo | $19.29/mo |
| | Renters | $15.38/mo | $12.14/mo | $3.24/mo |
| | | | Total | $22.53/mo |

*FIG. 1*

SYSTEMS AND METHODS FOR GENERATING DATA REPRESENTATIVE OF MULTI-PRODUCT INSURANCE DISCOUNTS AND RELATED USER INTERFACE DISPLAYS

TECHNICAL FIELD

The present disclosure generally relates to systems and methods to generate data representative of multi-product insurance discounts. In particular, the present disclosure relates to systems and methods to generate data representative of multi-product insurance discounts based on personal data of an insurance customer and insurance product data.

BACKGROUND

Insurance products are typically quoted and/or applied for through an insurance agent. The insurance agents may be aware of discounts available to potential insurance customers when the potential insurance customers select a certain insurance coverage and/or multi-product insurance packages. The insurance agents may communicate any multi-product insurance discounts to the potential insurance customer.

It is desirable to allow potential insurance customers to enter personal information via a user interface, select insurance products via the user interface and to view displays associated with multi-product insurance discounts.

SUMMARY

A computer-implemented method of automatically receiving data representative of multi-product insurance discounts is provided. The method may include receiving, at a processor of a computing device, personal data, wherein the personal data is representative of personal information of at least one individual seeking insurance. The method may also include receiving, at a processor of a computing device, insurance product data, wherein the insurance product data is representative of at least two insurance products. The method may further include generating, using a processor of a computing device, data representative of multi-product insurance discounts based on the personal data and the insurance product data.

In another embodiment, a computer system for generating data representative of multi-product insurance discounts is provided. The computer system may include a personal data receiving module stored on a memory that, when executed by a processor, causes the processor to receive personal data, wherein the personal data is representative of personal information of at least one individual seeking insurance. The computer system may also include an insurance product data receiving module stored on a memory that, when executed by a processor, causes the processor to receive insurance product data, wherein the insurance product data is representative of at least two insurance products. The computer system may further include a multi-product insurance discount data generating module stored on a memory that, when executed by a processor, causes the processor to generate data representative of multi-product insurance discounts based on the personal data and the insurance product data.

In a further embodiment, a tangible computer-readable memory storing instructions for generating data representative of multi-product insurance discounts is provided. The tangible computer-readable memory may include a personal data receiving module that, when executed by a processor, causes the processor to receive personal data, wherein the personal data is representative of personal information of at least one individual seeking insurance. The tangible computer-readable memory may also include an insurance product data receiving module that, when executed by a processor, causes the processor to receive insurance product data, wherein the insurance product data is representative of at least two insurance products. The tangible computer-readable memory may further include a multi-product insurance discount data generating module that, when executed by a processor, causes the processor to generate data representative of multi-product insurance discounts based on the personal data and the insurance product data.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 1 depicts an example user interface display generated based on data representative of multi-product insurance discounts;

DETAILED DESCRIPTION

Figure 2:
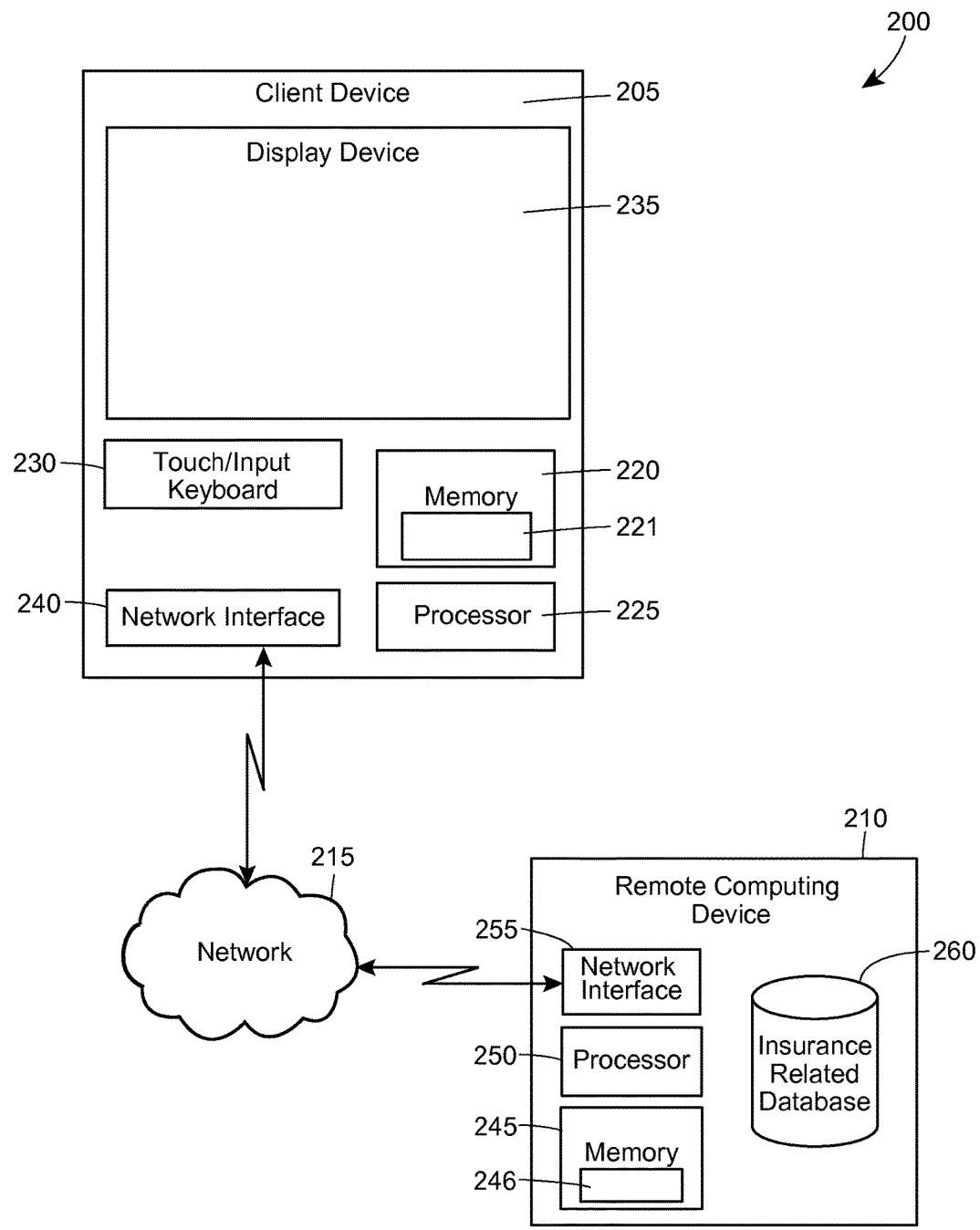
FIG. 2 illustrates a block diagram of an example computer network including a computer server and a client device for generating data representative of multi-product insurance discounts.

Systems and methods of the present disclosure may provide potential insurance customers and insurance sales associates (e.g., insurance agents) access to discount information available when multiple insurance products are purchased. For example, a user interface may be generated that displays a list of insurance product lines in response to a user (e.g. a potential insurance customer or an insurance sales associate) entering personal information (e.g., driver's license information, social security number, age, gender, student information, address, work history, type(s) of automobiles owned, type(s) of dwelling(s) owned and/or rented, etc.). The potential insurance customer and/or the insurance sales associate may select desired insurance products (e.g., insurance products, financial products, banking products and mutual fund products) from the list of insurance product lines using the user interface. The list of insurance product lines may include a price of each insurance product that reflects a price as if the insurance product is purchased individually.

Once the personal information is entered and the desired insurance products are selected, the user interface may generate a multi-product insurance discounts display (e.g., display 100 of FIG. 1). While FIG. 1, for example, depicts only insurance related products, the systems and methods of the present disclosure may provide cross line (e.g., financial, banking and mutual funds) discounts including non-insurance product discounts.

Turning to FIG. 1, a multi-product insurance discounts display 100 is depicted. A multi-product insurance discounts display 100 may include a list of products 110 having, for example, an automobile product entry 130 and a renters product entry 135. A multi-product insurance discounts display 100 may also include individual product non-discount price 115 adjacent an individual product discounted price (e.g., bundled price) 120. An individual product discount price 120 may reflect a price as if the potential insurance customer purchased additional products that result in a discount. A multi-product insurance discounts display 100 may further include an individual product savings 125. An individual product savings 125 may reflect a difference between an individual product non-discount price 115 and an individual product discounted price 120. A multi-product insurance discounts display 100 may include total savings 105, 140. While not shown in FIG. 1, a multi-product insurance discounts display 100 may include a total for all individual product non-discount price 115 and/or a total for all individual product discounted prices 120.

A multi-product insurance discounts display 100 may allow a potential insurance customer or an insurance sales associate to visualize values associated with purchasing multiple products (e.g., insurance products, financial products, banking products and mutual fund products). Associated prices may be included within a common display. Real-Time updates may be provided to a multi-product insurance discounts display 100 as a customer or sales professional adds additional products. Thereby, discount pricing may be updated to reflect all discounts. Any given product pricing may be saved for later consideration and pricing may be updated accordingly. While a multi-product insurance discounts display 100 may be generated within a user interface, for example, a multi-product insurance discounts display 100 may be presented to potential customers or sales associates within an email, a text message, or other types of electronic communications that allow the customers or sales associates to view discounts associated with purchasing multiple products.

With reference to FIG. 2, a high-level block diagram of an example computer system 200 is illustrated for generating data representative of multi-product insurance discounts. A computer system 200 may implement communications between a client device 205 and a remote computing device 210 (e.g., a remote server) to provide potential insurance customer personal information data, potential insurance customer personal information verification data, insurance product data and, or data representative of multi-product insurance discounts to an insurance related database 260. For example, a computer system 200 may acquire potential insurance customer personal information data, potential insurance customer personal information verification data and insurance product data from, for example, a user of a client device 205. As described in detail herein, a computer system 200 may generate data representative of multi-product insurance discounts based on potential insurance customer personal information data, potential insurance customer personal information verification data and insurance product data.

For clarity, only one client device 205 is depicted in FIG. 2. While FIG. 2 depicts only one client device 205, it should be understood that any number of client devices 205 may be supported and that each client device 205 may be any appropriate computing device, such as a mobile telephone, a personal data assistant, a tablet or a lap-top computer. A client device 205 may include a memory 220 and a processor 225 for storing and executing, respectively, a module 221. The module 221, stored in the memory 220 as a set of computer-readable instructions, may be related to an application for generating data representative of multi-product insurance discounts that, when executed on a processor 225, causes potential insurance customer personal information data, potential insurance customer personal information verification data and/or insurance product data to be stored in the memory 220. As described in detail herein, the module 221 may facilitate interaction between an associated client device 205 and a remote computing device 210. The processor 225, further executing the module 221, may facilitate communications between a remote computing device 210 and a client device 205 via a network interface 240 and a network 215.

A client device 205 may include a display device 235 which may be any type of electronic display device such as a liquid crystal display (LCD), a light emitting diode (LED) display, a plasma display, a cathode ray tube (CRT) display, or any other type of known or suitable electronic display. A display device 235 may exhibit a display which depicts a user interface for configuring a client device 205 to communicate with a remote computing device 210. A client device 205 may include a user input device 230, such as a touch input/keyboard/pointing device (e.g., a mouse) that provides a mechanism for a user of the client device 205 to launch a client device insurance application and, for example, to select desired products for pricing (e.g., insurance products, financial products, banking products and mutual fund products). The user input device 230 may be configured as an integral part of a display device 235, such as a touch screen display device. The network interface 240 may be configured to facilitate communications between a client device 205 and a remote computing device 210 via any wireless communication network 215, including for example a wireless LAN, MAN or WAN, WiFi, the Internet, or any combination thereof. Moreover, a client device 205 may be communicatively connected to a remote computing device 210 via any suitable communication system, such as via any publicly available or privately owned communication network, including those that use wireless communication structures, such as wireless communication networks, including for example, wireless LANs and WANs, satellite and cellular telephone communication systems, etc. A client device 205 may cause potential insurance customer personal information data, potential insurance customer personal information verification data and/or insurance product data to be transmitted to, and stored in, for example, a remote server 210 memory 245 and/or a remote insurance related database 260.

A remote computing device 210 may include a memory 245 and a processor 250 for storing and executing, respectively, a module 246. The module 246, stored in the memory 245 as a set of computer-readable instructions, may facilitate applications related to collecting potential insurance customer personal information data, potential insurance customer personal information verification data and insurance product data, for example, and to generate data representative of multi-product insurance discounts. The module 246 may also facilitate communications between the remote computing device 210 and a client device 205 via a network interface 255 and the network 255 and other functions and instructions.

A remote computing device 210 may be communicatively coupled to an insurance related database 260. While the insurance related database 260 is shown in FIG. 2 as being communicatively coupled to the remote computing device 210, it should be understood that the insurance related database 260 may be located within separate remote servers (or any other suitable computing devices) communicatively coupled to the remote computing device 210. Optionally, portions of insurance related database 260 may be associated with memory modules that are separate from one another, such as a memory 220 of a client device 205.

Figure 3:
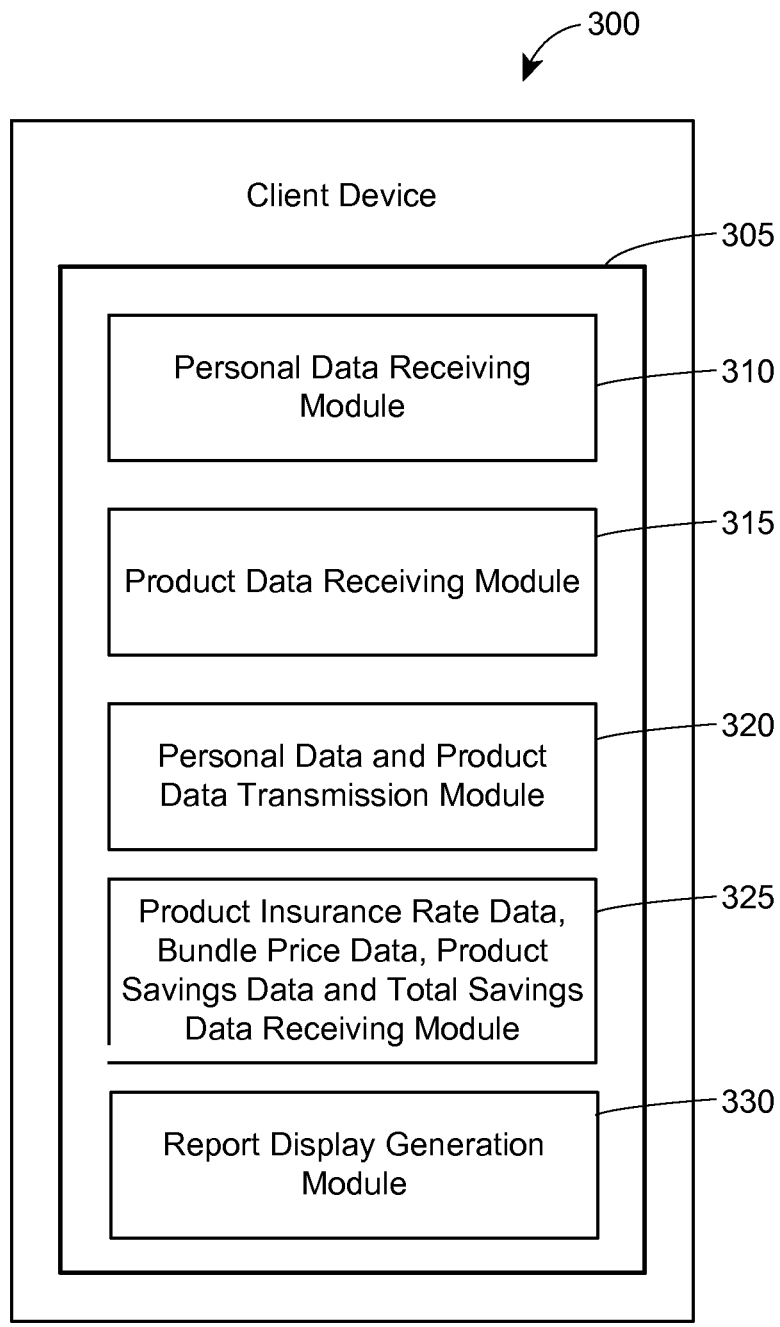
FIG. 3 illustrates a block diagram of an exemplary client device for generating data representative of multi-product insurance discounts.
Figure 4:
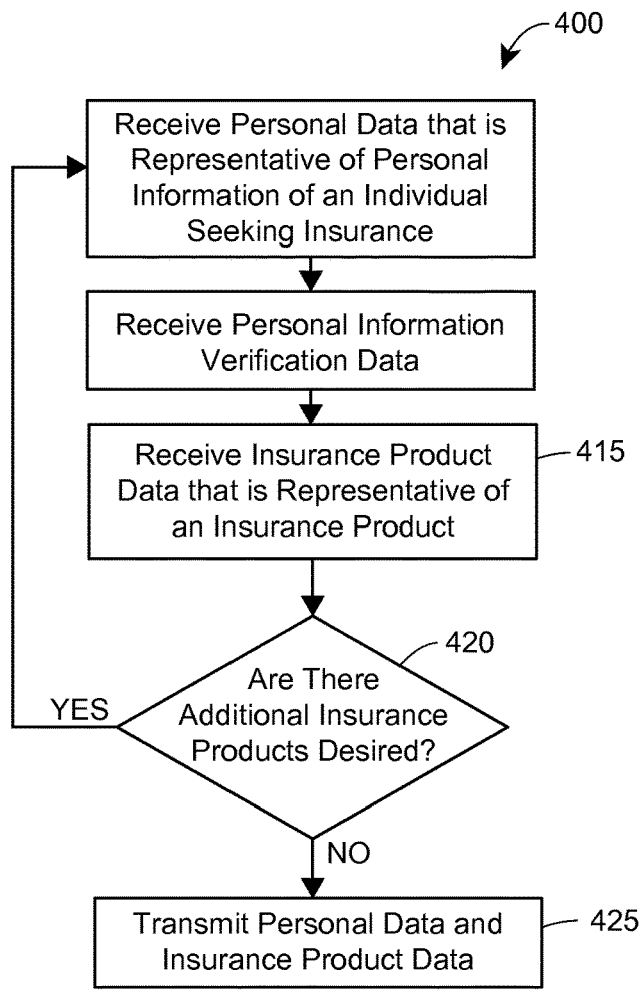
FIG. 4 depicts a flow diagram of an example method of acquiring and transmitting personal data and insurance product data.
Figure 5:
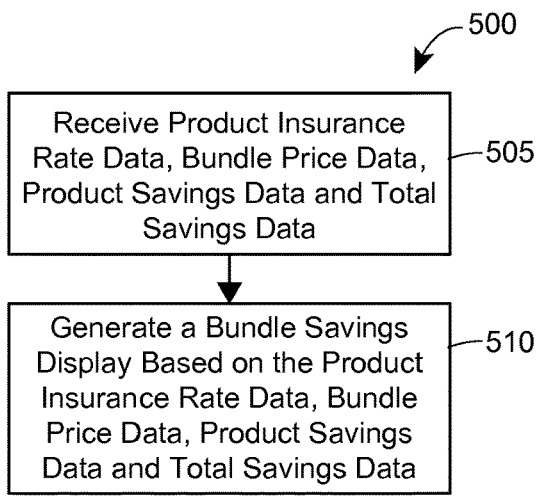
FIG. 5 depicts a flow diagram of an example method of generating data representative of multi-product insurance discounts.

Turning to FIGS. 3-5, a client device 305 of a multi-product insurance discount data generation system 300 is depicted along with a method of receiving potential insurance customer personal information data, potential insurance customer personal information verification data and/or insurance product data, and/or transmitting potential insurance customer personal information data, potential insurance customer personal information verification data and/or insurance product data 400 to a remote computing device 210, and a method of receiving insurance product rate data, bundle data, product savings data and total savings data, and/or generating a multi-product insurance discount display 500. The client device 305 may be similar to the client device 205 of FIG. 2. The method 400 may be implemented by executing the modules 310-330 on a processor (e.g., processor 225). In any event, the client device 305 may include a personal data receiving module 310, a product data receiving module 315, a personal data and product data transmission module 320, an insurance product rate data, bundle price data, product savings data and total savings data receiving module 325 and a report display generation module 330. The processor 225 may execute the personal data receiving module 310 to, for example, cause the processor 225 to receive personal data (block 405). Personal data may be, for example, representative of personal information of an individual seeking insurance. The processor 225 may further execute the personal data receiving module 310 to, for example, cause the processor 225 to receive personal information verification data (block 410). Personal information verification data may be, for example, representative of data that independently verifies personal data. For example, the personal information verification data may be obtained from a state bureau of motor vehicles database and may be used to verify a driving record of a person seeking insurance. Alternatively, or additionally, the personal information verification data may be obtained from an insurance company database and may be used to verify an insurance claim history of a person seeking insurance.

The processor 225 may execute the product data receiving module 315 to, for example, cause the processor 225 to receive insurance product data (block 415). Insurance product data may be, for example, representative of insurance products for which an individual wishes to obtain pricing. The processor 225 may determine whether additional insurance products are desired by an individual (block 420). If the processor 225 determines that additional insurance products are desired (block 420), the processor 225 may repeat blocks 405-415 of the method 400. If the processor 225 determines that additional insurance products are not desired (block 420), the processor 225 may continue to block 425.

The processor 225 may execute the personal data and product data transmission module 320 to, for example, cause the processor 225 to transmit personal data and/or insurance product data (block 425). For example, the processor 225 may execute the personal data and product data transmission module 320 to cause the processor 225 to transmit personal data and/or insurance product data from a client device 205, 305 to a remote computing device 210 (block 425).

The processor 225 may execute the insurance product rate data, bundle price data, product savings data and total savings data receiving module 325 to, for example, cause the processor 225 to receive data representative of multi-product insurance discounts (block 505). For example, the processor 225 may execute the insurance product rate data, bundle price data, product savings data and total savings data receiving module 325 to, for example, cause the processor 225 to receive, at a client device 205, 305, data representative of multi-product insurance discounts from a remote computing device 210 (block 505).

The processor 225 may execute the report display generation module 330 to, for example, cause the processor 225 to generate a display (e.g., a multi-product insurance discount display 100 of FIG. 1) (block 510). For example, the processor 225 may execute the report display generation module 330 to, for example, cause the processor 225 to generate a display (e.g., a multi-product insurance discount display 100 of FIG. 1) based on insurance product rate data, bundle price data, product savings data and total savings data (block 510).

Figure 6:
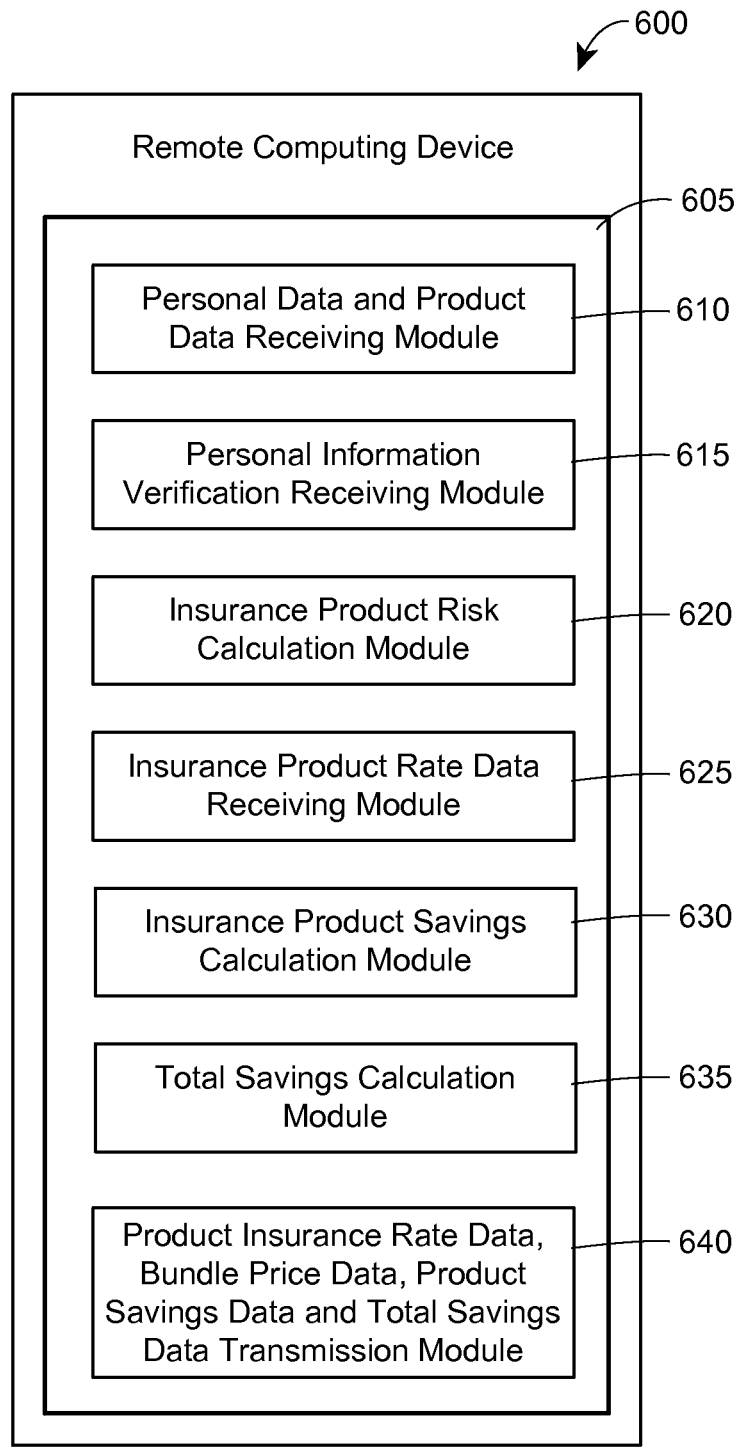
FIG. 6 illustrates a block diagram of an exemplary remote server for use in generating data representative of multi-product insurance discounts.
Figure 7:
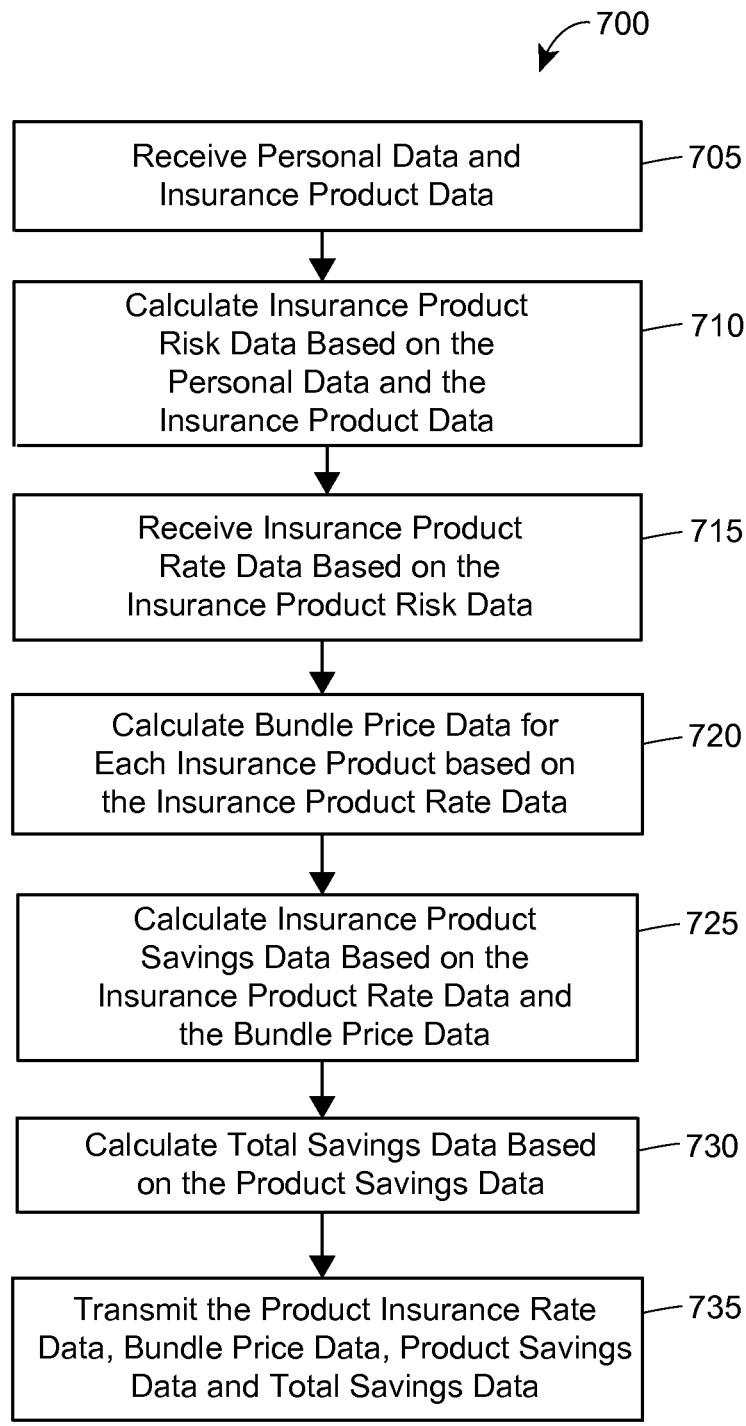
FIG. 7 depicts a flow diagram of an example method of generating and transmitting data representative of multi-product insurance discounts.

Turning to FIGS. 6 and 7, a remote computing device 605 of multi-product insurance discount data generation system 600 is depicted along with a method of generating data representative of multi-product insurance discounts and/or transmitting data representative of multi-product insurance discounts 700. The remote computing device 605 may be similar to the remote computing device 210 of FIG. 2. The method 700 may be implemented by executing the modules 610-640 on a processor (e.g., processor 250). In any event, the remote computing device 605 may include a personal data and product data receiving module 610, a personal information verification receiving module 615, an insurance product risk calculation module 620, an insurance product rate data receiving module 625, an insurance product savings calculation module 630, a total savings calculation module 635 and a multi-product insurance discount data transmission module 640. The processor 250 may execute the personal data and product data receiving module 610 to, for example, cause the processor 250 to receive personal data and/or insurance product data (block 705). For example, the processor 250 may execute the personal data and product data receiving module 610 to cause the processor 250 to receive, at a remote computing device 210, 605 personal data and/or insurance product data from a client device 205, 305 (block 705).

The processor 250 may execute the personal information verification receiving module 615 to, for example, cause the processor 250 to receive personal information verification data (block 750). Personal information verification data may be, for example, representative of data that independently verifies personal data. For example, the personal information verification data may be obtained from a state bureau of motor vehicles database and may be used to verify a driving record of a person seeking insurance. Alternatively, or additionally, the personal information verification data may be obtained from an insurance company database and may be used to verify an insurance claim history of a person seeking insurance.

The processor 250 may execute the insurance product risk calculation module 620 to, for example, cause the processor 250 to calculate insurance product risk data (block 710). For example, the processor 250 may execute the insurance product risk calculation module 620 to cause the processor 250 to calculate insurance product risk data based on insurance product data, personal data and/or personal information verification data (block 710).

The processor 250 may execute the insurance product rate data receiving module 625 to, for example, cause the processor 250 to receive insurance product rate data (block 715). For example, the processor 250 may execute the insurance product rate data receiving module 625 to cause the processor 250 to receive, at a remote computing device 210, 605 insurance product rate data from an state insurance rate database (block 715).

The processor 250 may execute the insurance product savings calculation module 630 to, for example, cause the processor 250 to calculate insurance product savings data (block 720). For example, the processor 250 may execute the insurance product savings calculation module 630 to cause the processor 250 to calculate insurance product savings data for each of a plurality of products (e.g., insurance products, financial products, banking products and mutual fund products) based on insurance product rate data for a plurality of different products (block 720).

The processor 250 may execute the total savings calculation module 635 to, for example, cause the processor 250 to calculate total saving data (block 730). For example, the processor 250 may execute the total savings calculation module 635 to cause the processor 250 to calculate total saving data based on product savings data for a plurality of products (block 730).

The processor 250 may execute the multi-product insurance discount data transmission module 640 to, for example, cause the processor 250 to transmit data representative of multi-product insurance discounts (block 735). For example, the processor 250 may execute the multi-product insurance discount data transmission module 640 to cause the processor 250 to transmit, from a remote computing device 210, 605, data representative of multi-product insurance discounts to a client device 205, 305 (block 735).

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer-implemented method of automatically receiving data representative of multi-product insurance discounts from an internet computer network by individually controlled client devices, the method comprising:
   receiving, at a processor of a client device, personal data, wherein the personal data is representative of personal information of at least one individual seeking vehicle insurance, dwelling insurance, and a banking product;
   automatically receiving, at a processor of a computing device, personal information verification data in response to the processor receiving the personal data, wherein the personal information verification data is representative of verification of an insurance claim history of the at least one individual seeking insurance;
   automatically receiving, at a processor of a computing device, insurance product data from an insurance product database of a remote server, that is coupled to the client device and the internet computer network, in response to the processor receiving the personal data and the personal information verification data, wherein the insurance product data is representative of at least first and second prices for each of at least two insurance products that reflect a respective price as if each of the at least two insurance products is purchased individually, a third price for a banking product that reflects a price as if the banking product is purchased individually, and a plurality of multi-product insurance discount structures, and wherein the at least two insurance products include at least one vehicle insurance product and at least one dwelling insurance product;
   automatically generating, using a processor of a computing device, data representative of multi-product insurance discounts based on the personal data and the insurance product data, wherein the data representative of the multi-product insurance discounts reflects a difference in a fourth price associated with a total of the at least two insurance products separately and a fifth price associated with the at least two insurance products bundled, and a difference in a sixth price associated with one of the at least two insurance products separately and a seventh price associate with the one of the at least two insurance products bundled;
   transmitting, using a processor of a computing device, the data representative of multi-product insurance discounts to a remote computing device;
   receiving, at the processor of the remote computing device, non-insurance related data, wherein the non-insurance related data is representative of non-insurance product discounts associated with at least one of: financial products, banking products, or mutual fund products; and
   generating, using a processor of the remote computing device, a user interface display based on the data representative of multi-product insurance discounts and non-insurance related data, wherein the user interface display includes an entry for each of: the first price, the second price, the third price, the fourth price, the fifth price, the sixth price, and the seventh price.

2. The method of claim 1, further comprising:
   receiving, at a processor of a computing device, personal information verification data, wherein the personal information verification data is representative of verification of a driving record of the individual seeking insurance; and
   generating, using a processor of a computing device, data representative of multi-product insurance discounts based on the personal data, the personal information verification data and the insurance product data.

3. The method of claim 2, further comprising:
   generating, using a processor of a computing device, insurance product risk data based on personal data, the personal information verification data and the insurance product data.

4. The method of claim 1, wherein the insurance product data includes at least one of: insurance product rate data, insurance product bundle data or insurance product risk data.

5. The method of claim 1, further comprising:
   generating, using a processor of a computing device, insurance product risk data based on the personal data and the insurance product data.

6. The method of claim 1, further comprising:
   generating, using a processor of a computing device, insurance agent data based on change data when the processor is unable to determine whether, or not at least one change to the current insurance related information is acceptable.

7. A computer system for generating data representative of multi-product insurance discounts, the computer system comprising:
   a personal data receiving module stored on a memory that, when executed by a processor, causes the processor to receive personal data, wherein the personal data is representative of personal information of at least one individual seeking insurance;
   a personal information verification data receiving module stored on a memory that, when executed by a processor of a computing device, causes the processor to receive personal information verification data in response to the processor receiving the personal data, wherein the personal information verification data is representative of an insurance claim history of the individual seeking insurance;
   an insurance product data receiving module stored on a memory that, when executed by a processor, causes the processor to automatically receive insurance product data from an insurance product database in response to receiving the personal data and the personal information verification data, wherein the insurance product data is representative of at least two insurance products, and wherein the at least two insurance products include at least one vehicle insurance product and at least one dwelling insurance product;
   a multi-product insurance discount data generating module stored on a memory that, when executed by a processor, causes the processor to generate data representative of multi-product insurance discounts based on the personal data, the personal information verification data, and the insurance product data, wherein the data representative of the multi-product insurance discounts reflects a difference in a first price associated with the at least two insurance products separately and a second price associated with the at least two insurance products bundled, and a difference in a third price associated with one of the at least two insurance products separately and a fourth price associate with the one of the at least two insurance products bundled;
   a personal data and insurance product data transmitting module stored on a memory that, when executed by a processor, causes the processor to transmit the data representative of multi-product insurance discounts to a remote computing device;
   a non-insurance related data receiving module stored on a memory that, when executed by a processor of the remote computing device, causes the processor of the remote computing device to receive non-insurance related data, wherein the non-insurance related data is representative of non-insurance product discounts associated with at least one of: financial products, banking products, or mutual fund products; and
   a user interface display generation module stored on a memory of the remote computing device that, when executed by the processor of the remote computing device, causes the processor of the remote computing device to generate a user interface display based on the data representative of multi-product insurance discounts and the non-insurance related data, wherein the user interface display includes entries for the first price, the second price, the third price, and the fourth price.

8. The computer system of claim 7, further comprising:
   a personal data and insurance product data transmitting module stored on a memory that, when executed by a processor, causes the processor to transmit the personal data and the insurance product data to a remote computing device; and
   a multi-product insurance discount data generating module stored on a memory of the remote computing device that, when executed by a processor of the remote computing device, causes the processor of the remote computing device to generate data representative of multi-product insurance discounts based on the personal data and the insurance product data.

9. The computer system of claim 8, further comprising:
   a multi-product insurance discount data transmitting module stored on a memory of the remote computing device that, when executed by a processor of the remote computing device, causes the processor of the remote computing device to transmit data representative of multi-product insurance discounts to a client device.

10. The computer system of claim 9, wherein the data representative of multi-product insurance discounts includes at least one of: insurance product rate data, insurance product bundle data, product saving data, total savings data or insurance product risk data.

11. The computer system of claim 7, wherein the insurance product data includes at least one of: insurance product rate data, insurance product bundle data or insurance product risk data.

12. A tangible computer-readable memory storing instructions for generating data representative of multi-product insurance discounts, the tangible computer-readable memory comprising:
   a personal data receiving module that, when executed by a processor, causes the processor to receive personal data, wherein the personal data is representative of personal information of at least one individual seeking insurance;
   a personal information verification data receiving module that, when executed by a processor of a computing device, causes the processor to automatically receive personal information verification data in response to the processor receiving the personal data, wherein the personal information verification data is representative of an insurance claim history of the individual seeking insurance;
   an insurance product data receiving module that, when executed by a processor, causes the processor to automatically receive insurance product data from an insurance product database in response to receiving the personal data and the personal information verification data, wherein the insurance product data is representative of at least two insurance products and a banking product;
   a multi-product insurance discount data generating module that, when executed by a processor, causes the processor to generate data representative of multi-product insurance discounts based on the personal data and the insurance product data, wherein the data representative of the multi-product insurance discounts reflects a difference in a first price associated with the at least two insurance products separately and a second price associated with the at least two insurance products bundled, and a difference in a third price associated with one of the at least two insurance products separately and a fourth price associate with the one of the at least two insurance products bundled;

a personal data and insurance product data transmitting module that, when executed by a processor, causes the processor to transmit the data representative of multi-product insurance discounts to a remote computing device;

a non-insurance related data receiving module that, when executed by a processor of the remote computing device, causes the processor of the remote computing device to receive non-insurance related data, wherein the non-insurance related data is representative of non-insurance product discounts associated with at least one of: financial products, banking products, or mutual fund products; and a user interface display generation module that, when executed by the processor of the remote computing device, causes the processor of the remote computing device to generate a user interface display based on the data representative of multi-product insurance discounts and the non-insurance related data, wherein the user interface display includes entries for the first price, the second price, the third price, and the fourth price.

13. The tangible computer-readable memory of claim 12, further comprising:

a multi-product insurance discount data transmitting module that, when executed by a processor of the remote computing device, causes the processor of the remote computing device to transmit data representative of multi-product insurance discounts to a client device.

14. The tangible computer-readable memory of claim 13, wherein the data representative of multi-product insurance discounts includes at least one of: insurance product rate data, insurance product bundle data, product saving data, total savings data or insurance product risk data.

15. The tangible computer-readable memory of claim 12, further comprising:

a personal information verification data receiving module that, when executed by a processor of a computing device, causes the processor to receive personal information verification data, wherein the personal information verification data is representative of a driving record of the individual seeking insurance; and a multi-product insurance discount data generating module that, when executed by a processor, causes the processor to generate data representative of multi-product insurance discounts based on the personal data, the personal information verification data and the insurance product data.

* * * * *